United States Patent
Kang et al.

(10) Patent No.: US 10,410,114 B2
(45) Date of Patent: Sep. 10, 2019

(54) MODEL TRAINING METHOD AND APPARATUS, AND DATA RECOGNIZING METHOD

(71) Applicant: SAMSUNG ELECTRONICS CO., LTD., Suwon-si (KR)

(72) Inventors: Hyoa Kang, Seoul (KR); Hayoung Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 590 days.

(21) Appl. No.: 15/161,906

(22) Filed: May 23, 2016

(65) Prior Publication Data

US 2017/0083829 A1 Mar. 23, 2017

(30) Foreign Application Priority Data

Sep. 18, 2015 (KR) .......................... 10-2015-0132679

(51) Int. Cl.
*G06N 3/04* (2006.01)
*G06N 3/08* (2006.01)

(52) U.S. Cl.
CPC ........... *G06N 3/0454* (2013.01); *G06N 3/084* (2013.01)

(58) Field of Classification Search
CPC ... G06N 3/02; G06N 3/04; G06N 3/08; G05B 2219/33013; G05B 2219/39271; G05B 2219/39311; G05B 2219/39312
USPC ........................................ 706/12–15, 19, 31
See application file for complete search history.

(56) References Cited

U.S. PATENT DOCUMENTS

| | | | |
|---|---|---|---|
| 7,363,225 B2 | 4/2008 | Church et al. | |
| 7,499,857 B2 | 3/2009 | Gunawardana | |
| 8,359,201 B1 | 1/2013 | Talbot et al. | |
| 8,612,225 B2 | 12/2013 | Arakawa et al. | |
| 8,891,619 B2 | 11/2014 | Leontaris et al. | |
| 2004/0199384 A1 | 10/2004 | Hong | |
| 2006/0161407 A1* | 7/2006 | Lanza | G06F 19/18 703/11 |
| 2013/0317822 A1 | 11/2013 | Koshinaka | |
| 2014/0180986 A1 | 6/2014 | Hinton et al. | |
| 2014/0372112 A1 | 12/2014 | Xue et al. | |

FOREIGN PATENT DOCUMENTS

| | | |
|---|---|---|
| JP | 2010-176327 A | 8/2010 |
| JP | 2014-98874 A | 5/2014 |
| KR | 10-2007-0011050 A | 1/2007 |
| KR | 10-2014-0077423 A | 6/2014 |

OTHER PUBLICATIONS

Communication dated May 12, 2017 issued by the European Patent Office in counterpart Application No. 16180282.2.

(Continued)

*Primary Examiner* — Eric Nilsson
(74) *Attorney, Agent, or Firm* — Sughrue Mion, PLLC

(57) ABSTRACT

Disclosed herein are a model training method, a data recognizing method, and a model training apparatus. A model training method includes selecting a teacher model from a plurality of teacher models; receiving, at a student model, input data; and training the student model based on output data of the selected teacher model, the output data corresponding to the input data.

22 Claims, 9 Drawing Sheets

(56) References Cited

OTHER PUBLICATIONS

Cristian Bucila et al., "Model Compression", Proceedings of the Twelfth ACM SIGKDD International Conference on Knowledge Discovery and Data Mining, Aug. 20-23, 2006, XP058107730, 7 pgs. total.
Rich Caruana et al., "Ensemble Selection from Libraries of Models", Proceedings / Twenty-First International Conference on Machine Learning, Jul. 4, 2004, XP058138593, 9 pgs. total.
Lei Jimmy Ba et al., "Do Deep Nets Really Need to be Deep?", Proceedings of the 28th Annual Conference on Neural Information Processing Systems, Jun. 1, 2015, XP055366446, 9 pgs. total.
Cristian Bucila, et al; "Model Compression"; KDD; Aug. 20-23, 2006; 7 pgs. total.
Adriana Romero, et al; "Fitnets: Hints for Thin Deep Nets"; Under review as a conference paper at 1CLR 2015; 2014; 12 pgs. total.
Geoffrey Hinton, et al; "Distilling the Knowledge in a Neural Network"; NIPS; 2014; 9 pgs. total.

* cited by examiner

MODEL TRAINING METHOD AND APPARATUS, AND DATA RECOGNIZING METHOD

CROSS-REFERENCE TO RELATED APPLICATION

This application claims priority from Korean Patent Application No. 10-2015-0132679, filed on Sep. 18, 2015, in the Korean Intellectual Property Office, the disclosure of which is incorporated herein by reference in its entirety.

BACKGROUND

1. Field

Methods and apparatuses consistent with exemplary embodiments disclosed herein relate to a model training method and apparatus, and a data recognizing method.

2. Description of the Related Art

Recently, to classify an input pattern as a member that belongs to a predetermined group, researchers have been actively researching methods of applying efficient and accurate pattern recognition techniques performed by people to a computer. One such area of research is focused on an artificial neural network that models characteristics of biological nerve cells of a human by mathematical expressions. To classify an input pattern as a predetermined group, the neural network employs an algorithm that simulates a learning capability of a human brain. Through this algorithm, the neural network may generate mapping between the input pattern and output patterns. The capability of generating such mapping may be referred to as a "learning capability" of the neural network. Further, the neural network may have a generalization capability of generating a relatively accurate output with respect to an input pattern to be used for learning, based on a result of learning.

In addition, research is being conducted on a method of minimizing reduction in a recognition rate while miniaturizing an artificial neural network.

SUMMARY

Exemplary embodiments may address at least the above mentioned problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided A model training method comprising: selecting a teacher model from a plurality of teacher models; receiving, at a student model, input data; and training the student model based on output data of the selected teacher model, the output data corresponding to the input data.

The selecting may include selecting the teacher model from the plurality of teacher models based on accuracies of the plurality of teacher models.

The model training method may further include outputting data from the plurality of teacher models, and the selecting may include selecting the teacher model from the plurality of teacher models based on a correlation between the output data of the plurality of teacher models, the output data corresponding to the input data.

The selecting may include selecting another teacher model from the plurality of teacher models in response to determining that a correlation between the output data of the selected teacher model and the output data of the other selected teacher model is less than a threshold.

The training may further include training the student model based on output data of the student model.

The selecting and the training may be performed iteratively until the student model satisfies a predetermined condition.

The training may include training the student model based on a first loss between output data of the student model and first output data of the selected teacher model, the first output data corresponding to the input data, and a second loss between output data of a classifier layer derived from a hidden layer of the student model and second output data of the selected teacher model, and the method may further include: determining the first loss and the second loss using different methods.

The determining the first loss and the second loss may include determining the first loss and the second loss based on the first output data output from the selected teacher model and second output data output from a different selected teacher model.

The determining the first loss and the second loss may include determining the first loss and the second loss by applying different weights to the first output data and the second output data.

The model training method may further include setting an initial weight for the classifier layer to be an initial weight for a teacher model, among the plurality of teacher models, having a size most similar to a size of data input into the classifier layer, and selecting the teacher model having the size most similar to the size of data input into the classifier layer as the selected teacher model.

The training may include training the student model based on the output data of the selected teacher model and correct answer data corresponding to the input data.

The plurality of teacher models may have different initial weights, different neural network structures, different hyper parameters, or comprise different ensembles.

The model training method may further include determining a structure of the student model based on a size of data input into the selected one teacher model.

According to an aspect of another exemplary embodiment, there is provided a data recognizing method including: receiving target data to be recognized; and recognizing the target data using a trained model, wherein the model is trained based on output data of a teacher model, the output data corresponding to input data received by the model, the teacher model being selected from a plurality of teacher models.

The data recognizing method may further include selecting the teacher model based on accuracies of the plurality of teacher models or a correlation between output data of the plurality of teacher models, the output data corresponding to the input data.

The data recognizing method may further include training the model based on a first loss between output data of the model and first output data of the selected model, the first output data corresponding to the input data received by the model, and a second loss between output data of a classifier layer derived from a hidden layer of the model and second output data of the selected teacher model, and determining the first loss and the second loss using different methods.

According to an aspect of another exemplary embodiment, there is provided a non-transitory computer-readable recording medium which, when executed, causes a computer to execute a model training method including: selecting a teacher model from a plurality of teacher models; receiving, at a student model, input data; and training the student model based on output data of the selected teacher model, the output data corresponding to the input data.

According to an aspect of another exemplary embodiment, there is provided a model training apparatus including: a processor configured to train a student model; and a memory configured to store the trained student model, wherein the processor is configured to select a teacher model from a plurality of teacher models, and train the student model based on output data of the selected teacher model, the output data corresponding to input data received by the student model.

The processor may be configured to select the teacher model from the plurality of teacher models based on accuracies of the plurality of teacher models or a correlation between output data of the plurality of teacher models, the output data corresponding to the input data.

The processor may be configured to train the student model based on a first loss between output data of the student model and first output data of the selected teacher model, the first output data corresponding to the input data, and a second loss between output data of a classifier layer derived from a hidden layer of the student model and second output data of the selected teacher model, and the processor may determine the first loss and the second loss using different methods.

BRIEF DESCRIPTION OF THE DRAWINGS

The above and other aspects of the exemplary embodiments will become apparent and more readily appreciated from the following detailed description of certain exemplary embodiments, taken in conjunction with the accompanying drawings of which.

DETAILED DESCRIPTION

Figure 1:
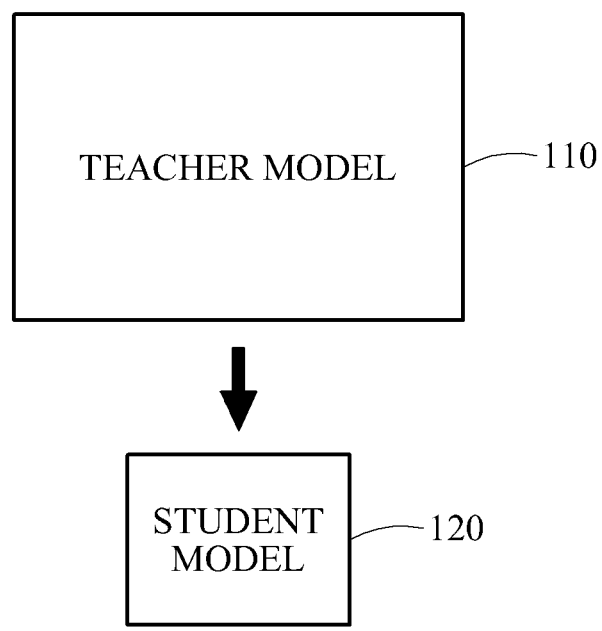
FIG. 1 is a diagram illustrating a teacher model and a student model according to an exemplary embodiment.

Reference will now be made in detail to exemplary embodiments, examples of which are illustrated in the accompanying drawings, wherein like reference numerals refer to the like elements throughout.

Hereinafter, exemplary embodiments are described in detail with reference to the drawings. The following specific structural or functional descriptions are exemplary and merely describe certain features of the exemplary embodiments, and the scope of the exemplary embodiments is not limited to the descriptions provided in the present specification. Various changes and modifications can be made thereto by those of ordinary skill in the art. Known functions or configurations may not be described herein.

FIG. 1 is a diagram illustrating a teacher model and a student model according to an exemplary embodiment.

Referring to FIG. 1, a teacher model 110 and a student model 120 are illustrated. The teacher model 110 and the student model 120 are models that are trained to output a predetermined output with respect to a predetermined input, and may include, for example, neural networks. A neural network refers to a recognition model that simulates a computation capability of a biological system using a large number of artificial neurons being connected to each other through edges. It is understood, however, that the teacher model 110 and student model 120 are not limited to neural networks, and may also be implemented in other types of networks and apparatuses.

The neural network uses artificial neurons configured by simplifying functions of biological neurons, and the artificial neurons may be connected to each other through edges having connection weights. The connection weights, parameters of the neural network, are predetermined values of the edges, and may also be referred to as connection strengths. The neural network may perform a cognitive function or a learning process of a human brain through the artificial neurons. The artificial neurons may also be referred to as nodes.

A neural network may include a plurality of layers. For example, the neural network may include an input layer, a hidden layer, and an output layer. The input layer may receive an input to be used to perform training and transmit the input to the hidden layer, and the output layer may generate an output of the neural network based on signals received from nodes of the hidden layer. The hidden layer may be disposed between the input layer and the output layer. The hidden layer may change training data received from the input layer to an easily predictable value. Nodes included in the input layer and the hidden layer may be connected to each other through edges having connection weights, and nodes included in the hidden layer and the output layer may also be connected to each other through edges having connection weights. The input layer, the hidden layer, and the output layer may respectively include a plurality of nodes.

The neural network may include a plurality of hidden layers. A neural network including the plurality of hidden layers may be referred to as a deep neural network. Training the deep neural network may be referred to as deep learning. Nodes included in the hidden layers may be referred to as hidden nodes. The number of hidden layers provided in a deep neural network is not limited to any particular number.

The neural network may be trained through supervised learning. Supervised learning refers to a method of providing input data and output data corresponding thereto to a neural network, and updating connection weights of edges so that the output data corresponding to the input data may be output. For example, a model training apparatus may update connection weights of edges among artificial neurons through a delta rule and error back-propagation learning.

Error back-propagation learning refers to a method of estimating a loss with respect to input data provided through forward computation, and updating connection weights to reduce a loss in a process of propagating the estimated loss in a backward direction from an output layer toward a hidden layer and an input layer. Processing of the neural network may be performed in an order of the input layer, the hidden layer, and the output layer. However, in the error back-propagation learning, the connection weights may be updated in an order of the output layer, the hidden layer, and the input layer. Hereinafter, according to an exemplary embodiment, training a neural network refers to training parameters of the neural network. Further, a trained neural network refers to a neural network to which the trained parameters are applied.

The teacher model 110 and the student model 120 may be neural networks of different sizes which are configured to recognize the same target. It is understood, however, that the teacher model 1110 and the student model 120 are not required to be different sizes.

The teacher model 110 is a model that recognizes target data with a relatively high accuracy based on a sufficiently large number of features extracted from target data to be recognized. The teacher model 110 may be a neural network of a greater size than the student model 120. For example, the teacher model 110 may include a larger number of hidden layers, a larger number of nodes, or a combination thereof, compared to the student model 120.

The student model 120 may be a neural network of a smaller size than the teacher model 110. Due to the relatively small size, the student model 120 may have a higher recognition rate than the teacher model 110. The student model 120 may be trained using the teacher model 110 to provide output data of the teacher model 110 with respect to input data. For example, the output data of the teacher model 110 may be a value of logic output from the teacher model 110, a probability value, or an output value of a classifier layer derived from a hidden layer of the teacher model 110. Accordingly, the student model 120 having a higher recognition rate than the teacher model 110 while outputting the same value as that output from the teacher model 110 may be obtained. The foregoing process may be referred to as model compression. Model compression is a scheme of training the student model 120 based on output data of the teacher model 110, instead of training the student model 120 based on correct answer data corresponding to a true label.

A plurality of teacher models 110 may be used to train the student model 120. At least one teacher model may be selected from the plurality of teacher models 110 and the student model 120 may be trained using the selected at least one teacher model. A process of selecting at least one teacher model from the plurality of teacher models 110 and training the student model 120 may be performed iteratively until the student model 120 satisfies a predetermined condition. In this example, at least one teacher model selected to be used to train the student model 120 may be newly selected each time a training process is performed. For example, one or more teacher models may be selected to be used to train the student model 120.

A process of selecting one or more teacher models from the plurality of teacher models 110 and training the student model 120 is described below with reference to FIGS. 2, 3, and 4.

Figure 2:
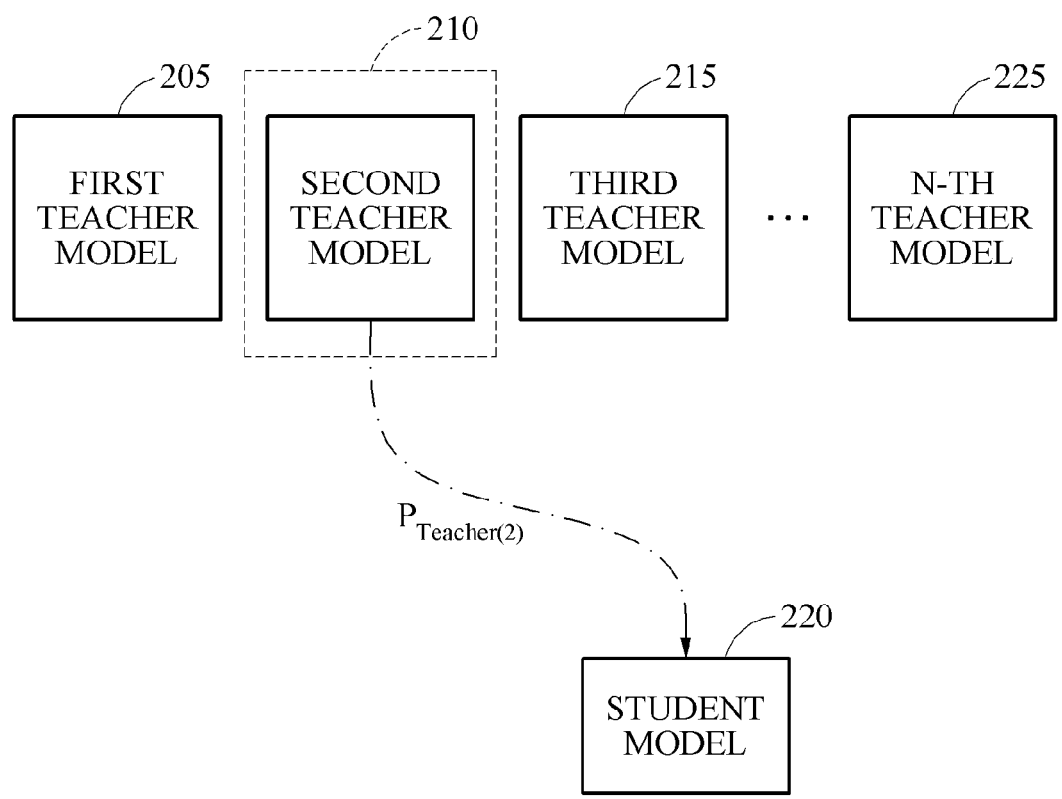
FIGS. 2, 3, and 4 are diagrams illustrating a process of selecting at least one teacher model from a plurality of teacher models and training a student model according to an exemplary embodiment.
Figure 3:
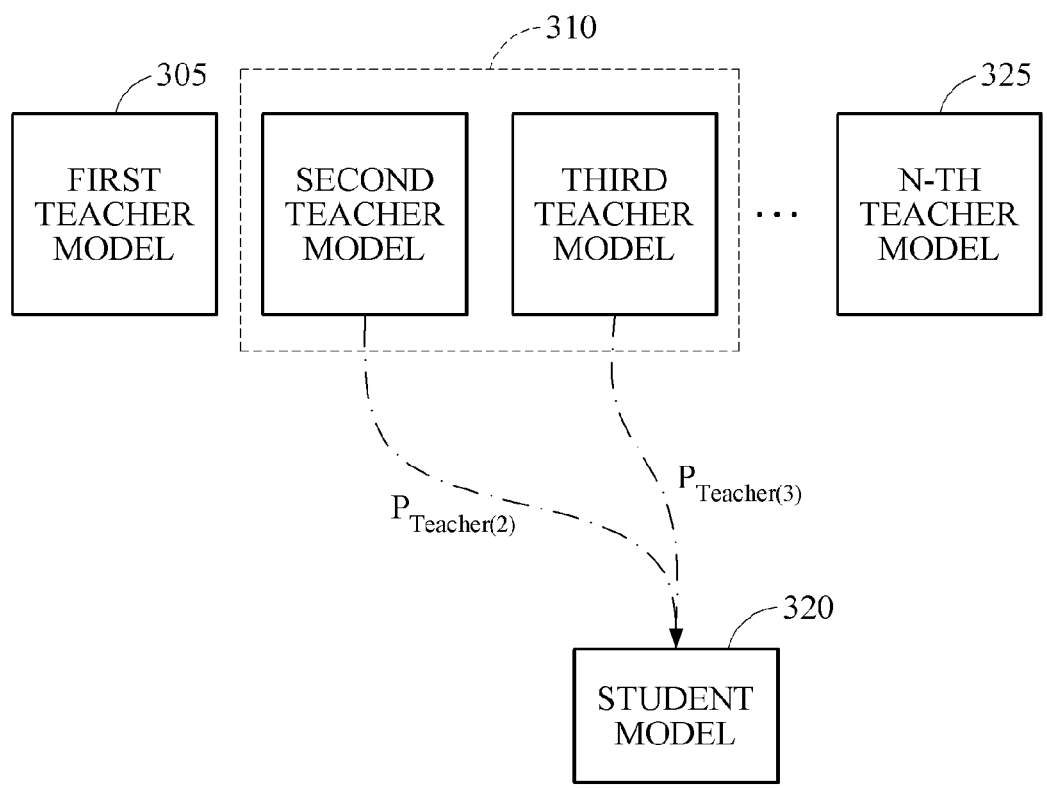
Figure 4:
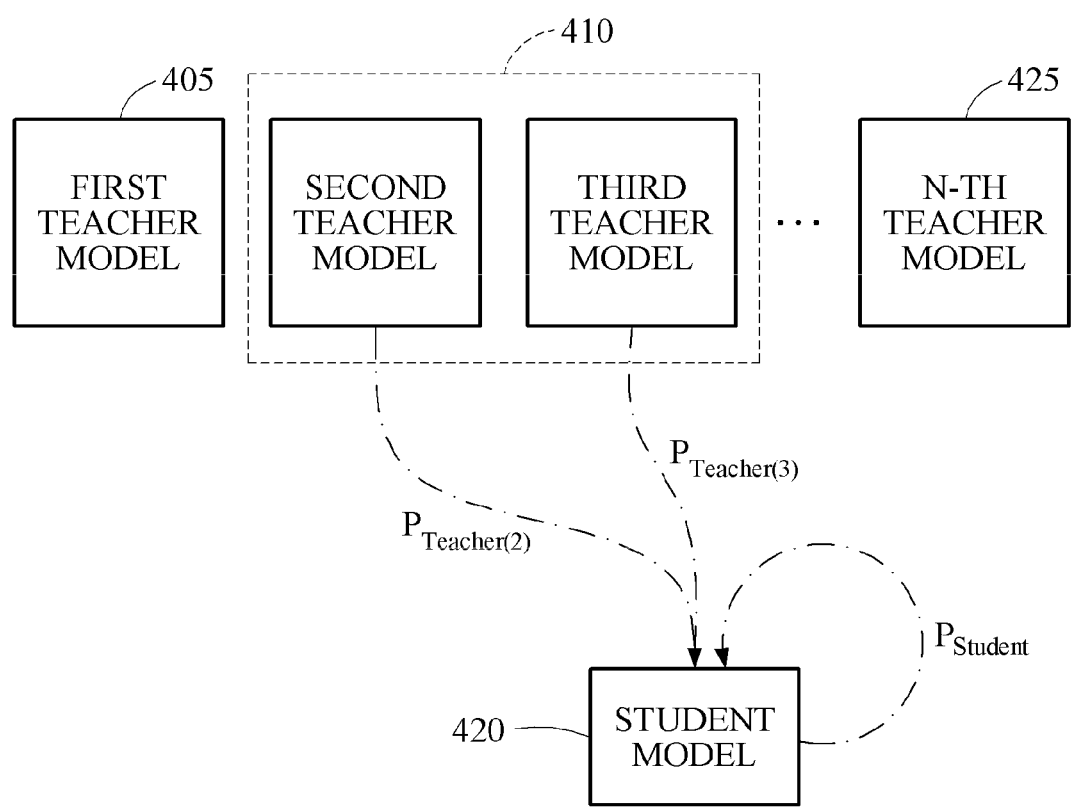

FIGS. 2, 3, and 4 are diagrams illustrating a process of selecting at least one teacher model from a plurality of teacher models and training a student model according to an exemplary embodiment.

Referring to FIG. 2, a process of selecting one teacher model from a plurality of teacher models to train a student model 220 is illustrated. The process of selecting one teacher model from the plurality of teacher models may be performed by a model training apparatus.

According to an exemplary embodiment, the model training apparatus is a device configured to train a neural network for data recognition, and may be implemented using a single processor or multiple processors which are specially configured to perform certain functions related to training a neural network for data recognition. The model training apparatus may also be implemented using a plurality of modules included in different devices. In this example, the plurality of modules may be connected to each other via a network, for example.

The plurality of teacher models are pre-trained models to be used to train the student model 220, and may have various structures and various accuracies. The plurality of teacher models may include first teacher model through N-th teacher model (e.g., first teacher model 205, second teacher model 210, third teacher model 215, N-th teacher model 225).

The plurality of teacher models may have different initial weights, have different neural network structures, have different hyper parameters, or include different ensembles, as described in detail below.

The plurality of teacher models may have different initial weights. The initial weights are initial values of connection weights of edges in a neural network. The initial weights may greatly affect a learning rate and a convergence rate in error back-propagation neural network training. Initial weights to be applied to the plurality of teacher models may be set to be different values using various methods such as, for example, random initialization and pre-training.

The plurality of teacher models may have different neural network structures. For example, the plurality of teacher models may have various neural network structures including different numbers of hidden layers, different numbers of filters, and kernels of different sizes, along with different shapes, sizes and network configurations.

The plurality of teacher models may include different hyper parameters. The hyper parameters may refer to training-associated parameters such as, for example, a learning rate and a momentum.

The plurality of teacher models may include different ensembles. A teacher model may include a single neural network, or an ensemble of a plurality of neural networks. When a teacher model includes an ensemble of a plurality of neural networks, the ensemble of the corresponding teacher model may be different from an ensemble of another teacher model.

The model training apparatus may select one teacher model from the plurality of teacher models based on accuracies of the plurality of teacher models. For example, the model training apparatus may select a teacher model having a highest accuracy from the plurality of teacher models. The model training apparatus may select, at random or according to a predetermined order, one of the teacher models having an accuracy greater than or equal to a threshold.

The model training apparatus may train the student model 220 using output data of a selected teacher model 210 as a label of the student model 220. The model training apparatus may train the student model 220 based on a loss which indicates a difference between output data of the student model 220 and the output data of the selected teacher model 210 with respect to input data. The model training apparatus may calculate the loss, and train the student model 220 to reduce the loss based on stochastic gradient descent (SGD). However, exemplary embodiments are not limited to reducing the loss based on SGD, and may also use other techniques (e.g., other gradient descent methods) instead of or in combination with SGD.

The model training apparatus may propagate the loss in a backward direction from an output layer toward a hidden layer and an input layer, and update connection weights to reduce the loss. Error propagation in the backward direction may be referred to as backward pass.

The model training apparatus may define an objective function to be used to measure optimalities of currently set connection weights, continuously change the connection weights based on a result of the objective function, and iteratively perform training. For example, the objective function may be a loss function to be used by a neural network to calculate a loss between actual output data and a value expected to be output, for example, the output data of the selected teacher model 210, with respect to input data. The model training apparatus may update the connection weights to reduce a value of the loss function.

The model training apparatus may calculate the loss, as expressed by Equation 1.

$$\text{Loss}(\theta)=f(P_{Teacher(i)},P_{Student})  \quad \text{[Equation 1]}$$

In Equation 1, $\text{Loss}(\theta)$ denotes a loss function, and $\theta$ denotes a parameter to be learned by the student model 220. $P_{Teacher(i)}$ denotes output data of a selected i-th teacher model, $P_{Student}$ denotes output data of the student model 220 with respect to input data, and f denotes a cross entropy, a softmax function, or a Euclidean distance between the output data $P_{Teacher(i)}$ of the selected i-th teacher model and the output data $P_{Student}$ of the student model 220.

FIG. 2 illustrates an example in which a second teacher model 210 is selected from the first teacher model through N-th teacher model, and the student model 220 is trained based on $P_{Teacher(2)}$ which denotes output data of the selected second teacher model.

In another example, the model training apparatus may train the student model 220 further based on correct answer data $T_r$. The model training apparatus may calculate the loss further based on the correct answer data $T_r$, as expressed by Equation 2.

$$\text{Loss}(\theta)=\alpha f(P_{Teacher(i)},P_{Student})+\beta g(T_r,P_{Student}) \quad \text{[Equation 2]}$$

In Equation 2, g denotes a cross entropy, a softmax function, or a Euclidean distance between the correct answer data $T_r$ and the output data $P_{Student}$ of the student model 220. $\alpha$ is a constant which denotes a weight applied to the output data $P_{Teacher(i)}$ of the selected i-th teacher model, and $\beta$ is a constant which denotes a weight applied to the correct answer data $T_r$.

The model training apparatus may determine effects of the output data $P_{Teacher(i)}$ of the selected i-th teacher model and the correct answer data $T_r$ on a process of training the student model 220, by adjusting values of $\alpha$ and $\beta$. For example, in a case in which the value of $\alpha$ is set to be greater than the value of $\beta$, the model training apparatus may train the student model 220, focusing more on the output data $P_{Teacher(i)}$ of the selected i-th teacher model than the correct answer data $T_r$.

Referring to FIG. 3, a process of selecting at least two teacher models from a plurality of teacher models to train a student model 320 is illustrated. The process of selecting at least two teacher models from the plurality of teacher models may be performed by a model training apparatus. The plurality of teacher models are pre-trained models to be used to train the student model 320, and may have various structures and various accuracies.

The model training apparatus may select at least two teacher models from the plurality of teacher models based on accuracies of the plurality of teacher models. The model training apparatus may select teacher models having accuracies greater than or equal to a threshold from the plurality of teacher models. The model training apparatus may arrange the plurality of teacher models based on the accuracies of the plurality of teacher models, and select a predetermined number of teacher models, for example, k teacher models, in a descending order of accuracy or another order.

The model training apparatus may select at least two teacher models from the plurality of teacher models based on a correlation between output data of the plurality of teacher models with respect to input data. The model training apparatus may select at least two teacher models 310, including a second teacher model and a third teacher model, from the plurality of teacher models including a first teacher model 305 through an N-th teacher model 325, when a correlation between output data of the selected at least two teacher models 310 is less than a threshold. For example, the model training apparatus may select at least two teacher models 310 from teacher models having accuracies greater than or equal to a first threshold when a correlation between output data of the selected teacher models 310 is less than a second threshold. In another example, the model training apparatus may select a teacher model having a highest accuracy and a predetermined number of teacher models, for example, k teacher models, from teacher models having accuracies greater than or equal to a threshold, in an ascending order of correlation with output data of the teacher model having the highest accuracy.

The model training apparatus may receive, from a user, an input which heuristically selects at least two teacher models from the plurality of teacher models.

FIG. 3 illustrates an example in which a second teacher model and a third teacher model are selected from a first teacher model 305 through an N-th teacher model 325, and the student model 320 is trained based on $P_{Teacher(2)}$ which denotes output data of the selected second teacher model and $P_{Teacher(3)}$ which denotes output data of the selected third teacher model.

The model training apparatus may train the student model 320 further based on correct answer data $T_r$. In a case in which at least two teacher models are selected from the plurality of teacher models, and the student model 320 is trained further based on the correct answer data $T_r$, the model training apparatus may calculate a loss, as expressed by Equation 3.

$$\text{Loss}(\theta)=\alpha f(P_{Teacher(i)},P_{Student})+\beta g(P_{Teacher(j)},P_{Student})+\gamma h(T_r,P_{Student}) \quad \text{[Equation 3]}$$

In Equation 3, $P_{Teacher(j)}$ denotes output data of a selected j-th teacher model, and g denotes a cross entropy, a softmax function, or a Euclidian distance between the output data $P_{Teacher(j)}$ of the selected j-th teacher model and output data $P_{Student}$ of the student model 320. h denotes a cross entropy, a softmax function, or a Euclidean distance between correct answer data $T_r$ and the output data $P_{Student}$ of the student model 320. $\beta$ is a constant which denotes a weight applied to the output data $P_{Teacher(j)}$ of the selected j-th teacher model, and $\gamma$ is a constant which denotes a weight applied to the correct answer data $T_r$. The model training apparatus may determine effects of the output data $P_{Teacher(i)}$ of the selected i-th teacher model, the output data $P_{Teacher(j)}$ of the selected j-th teacher model, and the correct answer data $T_r$, by adjusting values of $\alpha$, $\beta$, and $\gamma$.

The model training apparatus may train the student model 320 to reduce the loss calculated through Equation 3.

Referring to FIG. 4, a process of training a student model 420 further based on output data of the student model 420 is illustrated. The model training apparatus may calculate a loss based on output data of at least one teacher model 410 selected from a plurality of teacher models including a first teacher model 405 through an Nth teacher model 425 and output data of the student model 420, and train the student model 420 to reduce the loss.

In some cases, the student model 420 trained based on the selected at least one teacher model 410 may have a higher accuracy than the selected at least one teacher model 410. Thus, by training the student model 420 further based on the output data of the student model 420 having the relatively high accuracy, the model training apparatus may increase a learning rate or the accuracy of the student model 420.

The model training apparatus may measure the accuracy of the student model 420, and compare the accuracy of the student model 420 to the accuracies of the plurality of teacher models, thereby determining whether the output data of the student model 420 is to be used for training.

For example, when the accuracy of the student model 420 is higher than a highest accuracy among the accuracies of the plurality of teacher models, the model training apparatus may determine the output data of the student model 420 to be used for training. In another example, the model training apparatus may determine whether the output data of the student model 420 is to be used for training, by comparing the accuracy of the student model 420 to a statistical value of the accuracies of the plurality of teacher models. The statistical value may be, for example, an average value, or a value of top k % of the accuracies. In addition, depending on designs of various exemplary embodiments, various criteria may be used to determine whether the output data of the student model 420 is to be used for training.

FIG. 4 illustrates an example in which the student model 420 is trained based on output data $P_{Teacher(2)}$ of a selected second teacher model, output data $P_{Teacher(3)}$ of a selected third teacher model, and output data $P_{Student}$ of the student model 420.

Figure 5:
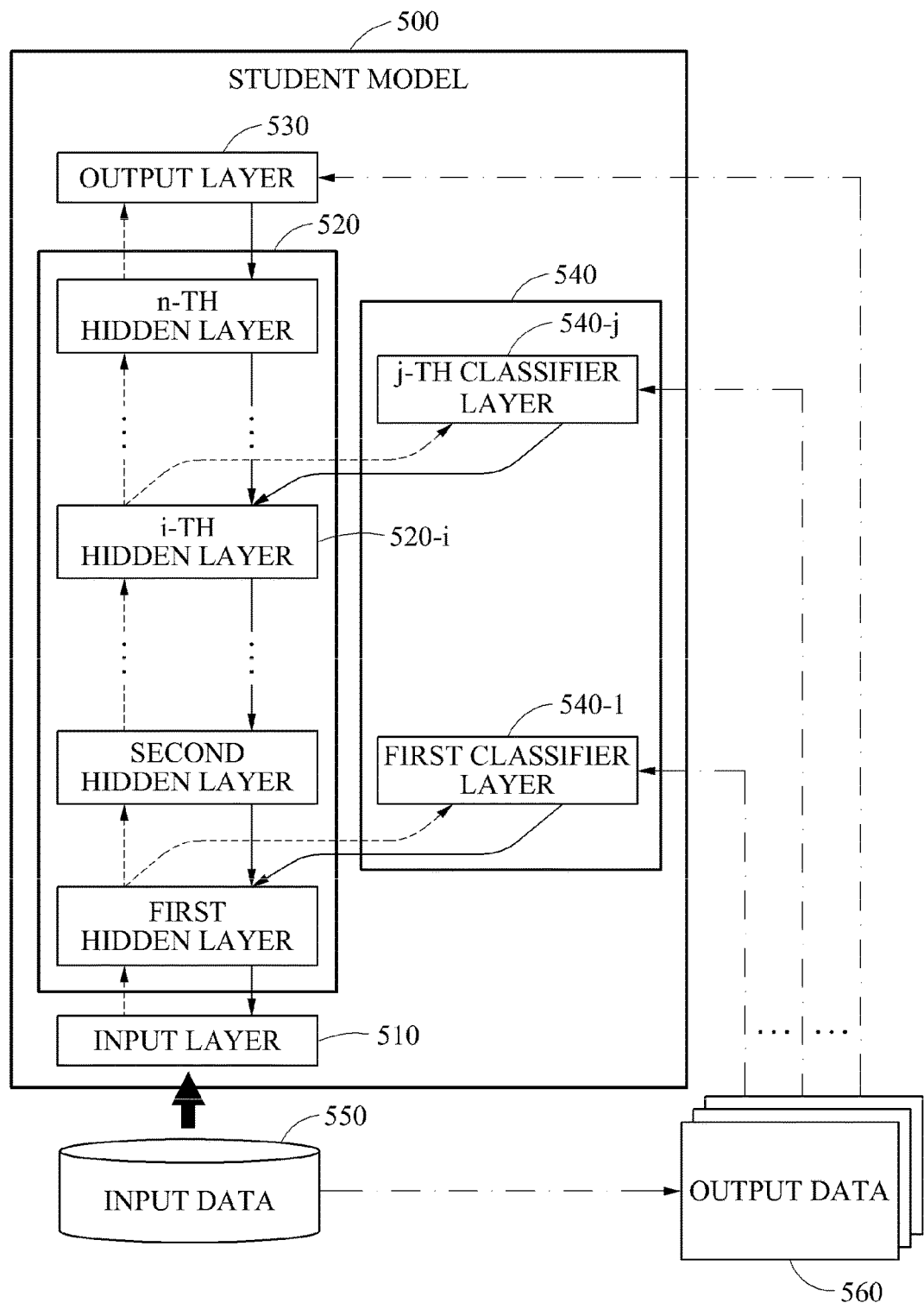
FIG. 5 is a diagram illustrating a training process using a classifier layer of a student model according to an exemplary embodiment.

FIG. 5 is a diagram illustrating a training process using a classifier layer of a student model according to an exemplary embodiment.

Referring to FIG. 5, a student model 500 may include an input layer 510, hidden layers 520, an output layer 530, and classifier layers 540. The student model 500 may be trained based on input data 550 and output data 560. In this example, the output data 560 may correspond to data output from at least one teacher model with respect to the input data 550, the at least one teacher model being selected from a plurality of teacher models. For example, the at least one teacher model may be selected according to the techniques described above in connection with FIGS. 2 through 4.

Although a process of training a student model using an output layer is described with reference to FIGS. 2 through 4, a model training apparatus according to an exemplary embodiment may train the student model using the output layer and a classifier layer derived from a hidden layer.

In the hidden layers 520, hidden nodes of a neural network may be classified by predetermined levels. The hidden layers 520 may be disposed between the input layer 510 and the output layer 530. For example, the hidden layers 520 may be fully connected layers or convolution filters in a convolutional neural network (NCC), or various types of layers or filters classified by predetermined functions or features. The hidden layers 520 may include a first hidden layer 520-1, a second hidden layer 520-2, an i-th hidden layer 520-I, through an n-th hidden layer 520-n.

The classifier layers 540 may be layers derived from the hidden layers 520. Similar to the output layer 530, the classifier layers 540 may provide output data corresponding to a predetermined element by analyzing values received from the hidden layers 520 from which the classifier layers 540 are derived. The classifier layers may include a first classifier layer 540-1 through a j-th classifier layer 540-j. Hereinafter, for ease of description, a process of training the student model 500 using a j-th classifier layer 540-j will be described. However, the descriptions may also be applicable to remaining classifier layers.

The model training apparatus may train the student model 500 further based on a loss between output data of the j-th classifier layer 540-j and output data 560 of a selected teacher model. Equations 1 through 3 may be used to calculate the loss between the output data of the j-th classifier layer 540-j and the output data 560 of the selected teacher model.

The calculated loss may be propagated backward to an i-th hidden layer 520-i through back propagation. The i-th hidden layer 520-i may update a connection weight based on a loss received from the derived j-th classifier layer 540-j and a loss received from an upper i+1-th hidden layer, add the two losses, and transmit the sum of the two losses to a lower i−1-th hidden layer.

When training the student model 500 additionally using the j-th classifier layer 540-j, a loss at the output layer 530 and a loss at the j-th classifier layer 540-j may be calculated using different methods. Hereinafter, the loss at the output layer 530 will be referred to as a first loss, and the loss at the j-th classifier layer 540-j will be referred to as a second loss. Further, output data of a selected teacher model to be used to calculate the first loss may also be referred to as first output data, and output data of a selected teacher model to be used to calculate the second loss may also be referred to as second output data.

The model training apparatus may calculate the first loss and the second loss using different methods. The model training apparatus may set different selected teacher models to output the first output data and the second output data. For example, the model training apparatus may calculate the first loss based on first output data output from a selected first teacher model, and calculate the second loss based on second output data output from a selected third teacher model.

The model training apparatus may determine different weights to be applied to the first output data and the second output data although the first output data and the second output data are output from the same selected teacher model. For example, in a case in which the first teacher model and the third teacher model are selected, and the first loss and the second loss are to be calculated, the model training apparatus may calculate the first loss and the second loss by setting a greater weight to output data of the first teacher model when calculating the first loss, and setting a greater weight to output data of the third teacher model when calculating the second loss. In addition, the model training apparatus may calculate a loss by setting a greater weight with respect to correct answer data to the output layer 530 and a layer closer to the output layer 530 among the classifier layers 540. It is understood that exemplary embodiments are not limited to the above exemplary techniques, and many different methods of setting weights may be used to calculate the first loss and the second loss.

The model training apparatus may determine different initial weights to be applied to the output layer 530 and the j-th classifier layer 540-j. The model training apparatus may set the initial weight of the j-th classifier layer 540-j to be an initial weight of a teacher model having a size most similar to a size of data input into the j-th classifier layer 540-j, the teacher model being selected from the selected at least one teacher model. Similarly, the model training apparatus may set the initial weight of the output layer 530 to be an initial weight of a teacher model having a size most similar to a size of data input into the output layer 530, the teacher model being selected from the selected at least one teacher model. For example, when the size of the data, for example, an input feature map, input into the j-th classifier layer 540-j is 128, the model training apparatus may set an initial weight of a teacher model having a most similar input size to be the initial weight of the j-th classifier layer 540-j, the teacher model being selected from the selected at least one teacher model.

For example, the loss at the j-th classifier layer 540-j may be calculated, as expressed by Equation 4.

$$\text{Loss}_j(\theta) = \alpha f_j(P_{Student\_j}, P_{Teacher(i)}) + \beta g_j(P_{Student\_j}, P_{Teacher(l)}) + \gamma h_j(P_{Student\_j}, T_r)$$ [Equation 4]

In Equation 4, $\text{Loss}_j$ denotes a loss function that calculates the loss at the j-th classifier layer 540-j, $P_{Teacher(l)}$ denotes output data of a selected l-th teacher model, and $P_{Student\_j}$ denotes output data of the j-th classifier layer 540-j with respect to the input data 550. $f_j$ denotes an entropy, a softmax function, or a Euclidian distance between the output data $P_{Student\_j}$ of the j-th classifier layer 540-j and the output data $P_{Teacher(i)}$ of the selected i-th teacher model, $g_j$ denotes an entropy, a softmax function, or a Euclidian distance between the output data $P_{Student\_j}$ of the j-th classifier layer 540-j and the output data $P_{Teacher(l)}$ of the selected l-th teacher model, and $h_j$ denotes an entropy, a softmax function, or a Euclidian distance between the output data $P_{Student\_j}$ of the j-th classifier layer 540-j and the correct answer data $T_r$. $\alpha$, $\beta$, and $\gamma$ are constants which denote weights to be applied to the output data $P_{Teacher(i)}$ of the selected i-th teacher model, the output data $P_{Teacher(l)}$ of the selected l-th teacher model, and the correct answer data $T_r$, respectively.

A process of training the student model 500 using the output layer 530 and the j-th classifier layer 540-j is described above. However, the foregoing descriptions may be applicable to remaining classifier layers included in the classifier layers 540.

In detail, the model training apparatus may calculate losses at a plurality of classifier layers using different methods. For example, the model training apparatus may calculate the losses at the plurality of classifier layers based on output data of different selected teacher models. Further, the model training apparatus may calculate the losses at the plurality of classifier layers by setting different weights to be applied to output data of selected teacher models. In addition, the model training apparatus may calculate the losses at the plurality of classifier layers by applying different initial weights to the plurality of classifier layers.

Figure 6:
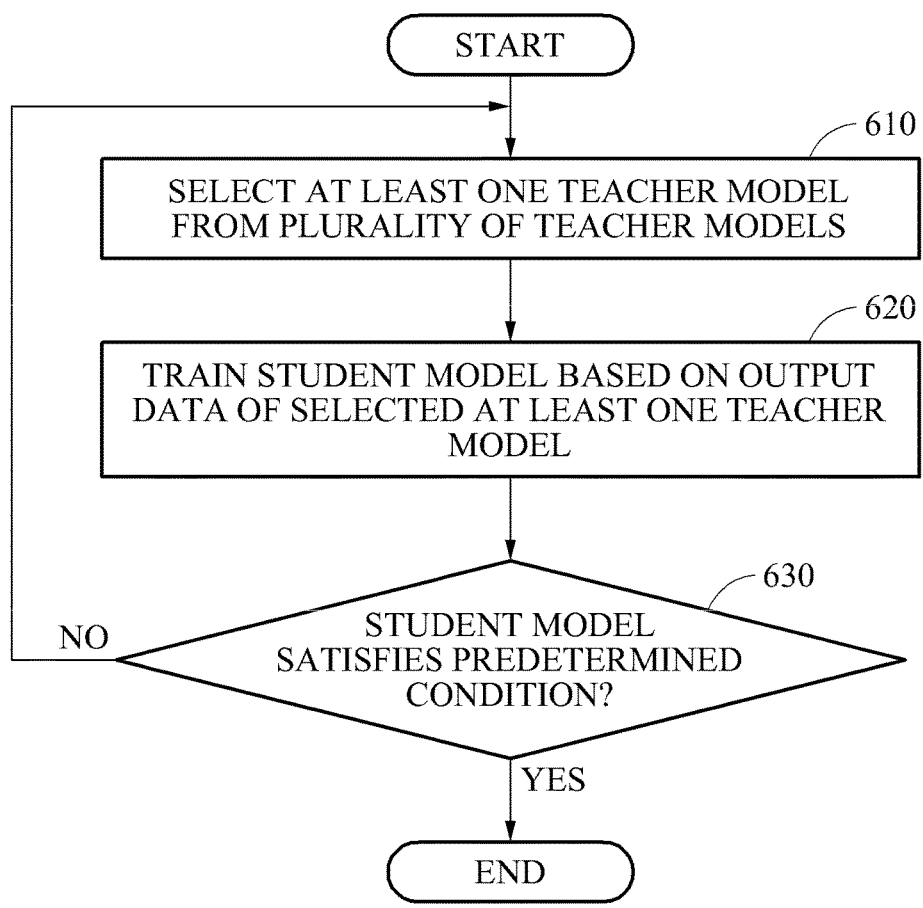
FIG. 6 is a flowchart illustrating a model training method according to an exemplary embodiment.

FIG. 6 is a flowchart illustrating a model training method according to an exemplary embodiment.

The model training method may be performed by a processor included in a model training apparatus. The processor may be specially configured to perform the operations shown in FIG. 6.

Referring to FIG. 6, in operation 610, the model training apparatus selects at least one teacher model from a plurality of teacher models. The plurality of teacher models may have different initial weights, may have different neural network structures, may have different hyper parameters, or may include different ensembles.

The model training apparatus may select at least one teacher model from the plurality of teacher models based on accuracies of the plurality of teacher models. For example, the model training apparatus may select a teacher model having a highest accuracy from the plurality of teacher models, or select teacher models having accuracies greater than or equal to a threshold from the plurality of teacher models. Further, the model training apparatus may arrange the plurality of teacher models based on the accuracies of the plurality of teacher models, and select a predetermined number of teacher models, for example, k teacher models, in a descending order of accuracy or according to another predetermined order.

The model training apparatus may select at least two teacher models from the plurality of teacher models based on a correlation between output data of the plurality of teacher models with respect to input data. Also, the model training apparatus may select at least two teacher models from the plurality of teacher models when a correction between output data of the selected teacher models is less than a threshold.

The model training apparatus may receive, from a user, an input which heuristically selects at least one teacher model from the plurality of teacher models. It is understood, however, that exemplary embodiments are not limited to an input which heuristically selects the at least one teacher model, and other types of selection may also be used according to exemplary embodiments.

In operation 620, the model training apparatus may train a student model based on output data of the selected teacher model with respect to input data. The model training apparatus may train the student model based on a loss between output data of the student model and the output data of the selected teacher model with respect to the input data.

The model training apparatus may train the student model further based on the output data of the student model. In addition, the model training apparatus may train the student model further based on correct answer data corresponding to the input data.

The model training apparatus may train the student model based on a first loss between the output data of the student model and first output data of the selected at least one teacher model with respect to the input data, and a second loss between output data of a classifier layer derived from a hidden layer of the student model and second output data of the selected at least one teacher model.

According to an exemplary embodiment, the first loss and the second loss may be determined using different methods. The first loss and the second loss may be determined based on first output data and second output data output from different selected teacher models, or determined by applying different weights to the first output data and the second output data. An initial weight of the classifier layer may be set to be an initial weight of a teacher model with a size most similar to a size of data input into the classifier layer, the teacher model being selected from the selected at least one teacher model.

The model training apparatus may determine a structure of the student model based on a size of data input into the selected teacher model. The model training apparatus may change the structure of the student model based on a difference between the size of the data input into the selected teacher model and the size of the data input into the student model. For example, when the size of the data input into the selected teacher model corresponds to 64 pixels×64 pixels, and the size of the data input into the student model corresponds to 32 pixels×32 pixels, the structure of the student model may be changed so that the student model may have a receptive field (e.g., a particular region of sensory space in which a stimulus will trigger the firing of a neuron) identical or similar to that of the selected teacher model.

The model training apparatus may change a number of nodes of an input layer, a number of hidden layers, and a number of nodes of the hidden layers included in the student model based on the size of the data input into the selected teacher model.

In operation 630, the model training apparatus may determine whether the student model satisfies a predetermined condition.

For example, in operation 630, the model training apparatus may determine whether an accuracy of the student model is greater than or equal to a threshold. When the accuracy of the student model is less than the threshold, the model training apparatus may re-perform operations 610 and 620. Each time operation 610 is re-performed, at least one of the plurality of teacher models may be variably selected based on a predetermined criterion. For example, when operation 610 is re-performed, at least one of the remaining teacher models, excluding a teacher model used to train the student model in previous operation 620, may be selected. Through the foregoing process, overfitting of the student model to a single teacher model may be effectively prevented. In addition, the model training apparatus may control weights to be applied to the output data of the selected teacher model and the correct answer data based on training progress, for example, an accuracy of the student model. For example, the model training apparatus may set a greater weight for the correct answer data than the output data of the selected teacher model as the student model is trained. Conversely, when the accuracy of the student model is greater than or equal to a threshold, the model training apparatus may terminate training of the student model.

As another example, in operation 630, the model training apparatus may determine whether a training count of the student model satisfies a preset iteration count. When the training count of the student model does not satisfy the preset iteration count, the model training apparatus may re-perform operations 610 and 620. In this example, each time operation 610 is re-performed, at least one of the plurality of teacher modules may be variably selected based on the predetermined criterion. Conversely, when the training count of the student model satisfies the preset iteration count, the model training apparatus may terminate training of the student model.

Figure 7:
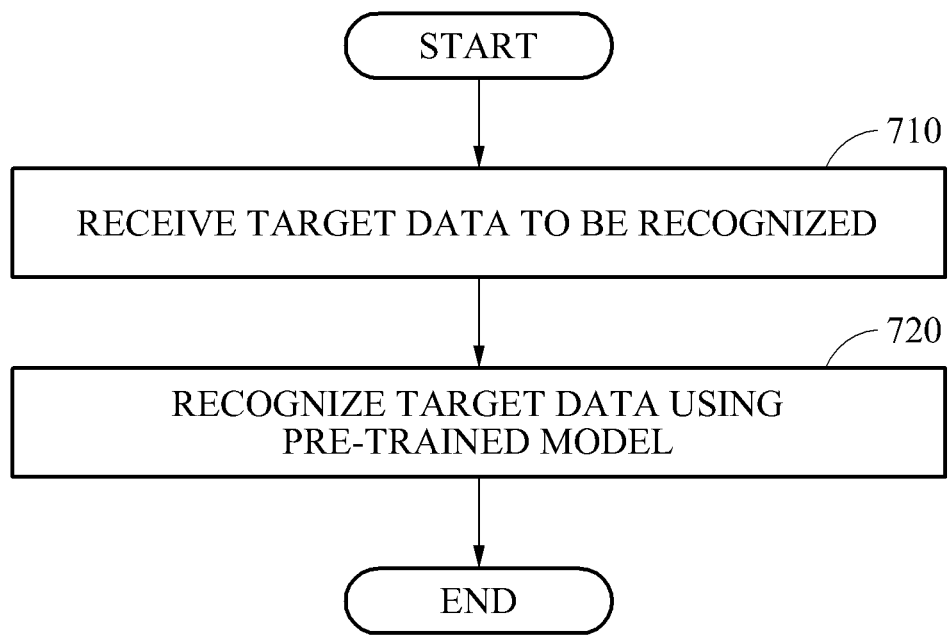
FIG. 7 is a flowchart illustrating a data recognizing method according to an exemplary embodiment.

FIG. 7 is a flowchart illustrating a data recognizing method according to an exemplary embodiment.

The data recognizing method may be performed by a processor included in a data recognizing apparatus. The processor may be specially configured to perform the operations Referring to FIG. 7, in operation 710, the data recognizing apparatus receives target data to be recognized. The target data is data to be recognized through a pre-trained model, and may include, for example, image data, video data, speech data, time-series data, sensor data, or various combinations thereof.

In operation 720, the data recognizing apparatus recognizes the target data using the pre-trained model. A model refers to a neural network capable of detecting objects from the target data, or classifying or clustering the objects. The model according to exemplary embodiments may also be capable of performing other functions in addition to detecting, classifying, or clustering the objects.

The model may be trained based on output data of at least one teacher model with respect to input data, the at least one teacher model being selected from a plurality of teacher models. For example, the model may be trained based on a loss between the output data of the selected at least one teacher model and output data of a student model with respect to the input data.

In this example, the at least one teacher model is selected based on accuracies of the plurality of teacher models or a correlation between output data of the plurality of teacher models with respect to the input data.

Further, the model may be trained based on (i) a first loss between output data of the model and first output data of the selected at least one teacher model with respect to the input data, and (ii) a second loss between output data of a classifier layer derived from a hidden layer of the model and second output data of the selected at least one teacher model. In this example, the first loss and the second loss may be determined using different methods, although are not limited thereto, and may alternatively be determined using the same method.

The descriptions provided with reference to FIGS. 1 through 6 may be applicable to a process of training a model to recognize target data and thus, repeated descriptions thereof will be omitted for conciseness.

Figure 8:
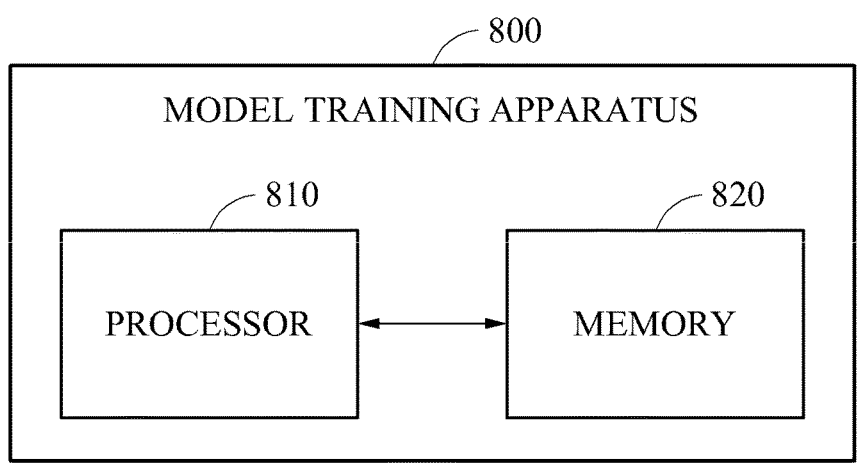
FIG. 8 is a block diagram illustrating a model training apparatus according to an exemplary embodiment.

FIG. 8 is a block diagram illustrating a model training apparatus according to an exemplary embodiment.

Referring to FIG. 8, a model training apparatus 800 includes a processor 810 and a memory 820. The model training apparatus 800 is an apparatus that trains a neural network for data recognition, and may be implemented using a single processor or multiple processors.

The processor 810 may select at least one teacher model from a plurality of teacher models, and train a student model based on output data of the selected at least one teacher model with respect to input data. For example, the processor 810 may train the student model based on a loss between output data of the student model and the output data of the selected at least one teacher model with respect to the input data. The processor 810 may be implemented as many different types of hardware processors, and may be specially configured to perform the above-described functions of selecting at least one teacher model and training a student model, in addition to other types of functions.

The processor 810 may select at least one teacher model from the plurality of teacher models based on accuracies of the plurality of teacher models or a correlation between output data of the plurality of teacher models with respect to the input data.

The processor 810 may train the student model based on (i) a first loss between output data of the student model and first output data of the selected at least one teacher model with respect to the input data, and (ii) a second loss between output data of a classifier layer derived from a hidden layer of the student model and second output data of the selected at least one teacher model. According to an exemplary embodiment, the first loss and the second loss may be determined using different methods.

The input data is training data to be used to train the student model, and may include, for example, image data, audio data (e.g., speech data, music data, etc.), or various combinations thereof.

The memory 820 may store the student model trained by the processor 810.

Figure 9:
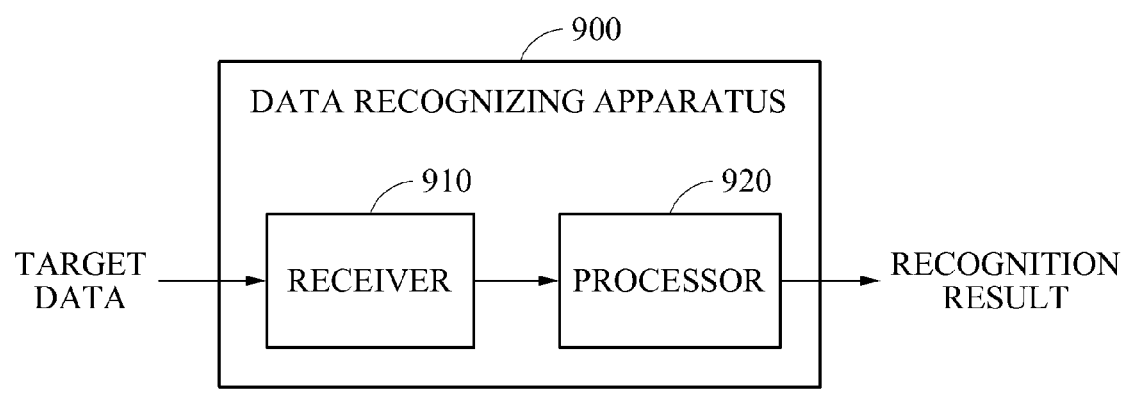
FIG. 9 is a block diagram illustrating a data recognizing apparatus according to an exemplary embodiment.

FIG. 9 is a block diagram illustrating a data recognizing apparatus according to an exemplary embodiment.

Referring to FIG. 9, a data recognizing apparatus 900 includes a receiver 910 and a processor 920. The data recognizing apparatus 900 is an apparatus capable of recognizing received target data through a pre-trained model, and may be provided in various computing devices and/or systems such as, for example, a smart phone, a tablet computer, a laptop computer, a desktop computer, a television, a wearable device, a security system, and a smart home system.

The receiver 910 may receive target data to be recognized.

The processor 920 may recognize the target data using a pre-trained model. The model may be trained based on output data of at least one teacher model with respect to input data, the at least one teacher model being selected from a plurality of teacher models. For example, the model may be trained based on a loss between output data of a student model and output data of the selected at least one teacher model with respect to the input data.

Exemplary embodiments may select at least one teacher model from a plurality of teacher models and train a student model using the selected at least one teacher model, thereby effectively increasing a learning rate and an accuracy of the student model.

Additionally, exemplary embodiments may variably select at least one teacher model from a plurality of teacher models based on a predetermined criterion, thereby preventing overfitting of a student model to a predetermined teacher model.

Exemplary embodiments may also calculate a loss at an output layer of a student model and a loss at a classifier layer of the student model using different methods, thereby effectively updating connection weights in a neural network, even though the student model is a deep neural network. Additionally, according to certain exemplary embodiments, the process of training a student model may be iteratively performed by randomly selecting at least one teacher model from a plurality of teacher models until the accuracy of the student model satisfies a predetermined condition(s). Moreover, according to certain exemplary embodiments, multiple teacher models may be selected and used to re-train a single student model.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purposes of simplicity, the above description of a processing device is described in the singular; however, one skilled in the art will appreciate that a processing device may include multiple processing elements and may further include multiple types of processing elements. For example, a processing device may include multiple processors or a processor and a controller. In addition, different processing configurations are possible, such as parallel processors.

The software implemented in accordance with exemplary embodiments may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or may be embodied in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described exemplary embodiments may be recorded in non-transitory computer-readable media including program instructions to implement various operations of the above-described exemplary embodiments. The media may also include, alone or in combination with the program instructions, data files, data structures, and the like. The program instructions recorded on the media may be those specially designed and constructed for the purposes of carrying out the functions of exemplary embodiments, or they may be of the well-known type and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as the code produced by a compiler, and files containing higher level code that may be executed by the computer using an interpreter. The above-described devices may be configured to act as one or more software modules in order to perform the operations of the above-described exemplary embodiments, or vice versa.

A number of exemplary embodiments have been described above. Nevertheless, it should be understood that various modifications may be made to these exemplary embodiments. For example, suitable results may be achieved if the described techniques are performed in a different order and/or if components in a described system, architecture, device, or circuit are combined in a different manner and/or replaced or supplemented by other components or their equivalents. Accordingly, many different types of implementations fall within the scope of the following claims.

What is claimed is:

1. A model training method comprising:
    selecting a first neural network and a second neural network implementing a first teacher model and a second teacher model, from a plurality of teacher models, based on an output data of each of the plurality of teacher models;
    receiving a first input data at a third neural network implementing a student model; and
    training the student model, based on the first input data, and a first output data and a second output data that are respectively output from the first teacher model and the second teacher model with respect to the first input data,
    wherein the student model comprises:
        an input layer configured to receive the first input data;
        an output layer configured to output a third output data;
        a hidden layer disposed between the input layer and the output layer; and a classifier layer derived from the hidden layer and configured to output a fourth output data, and
wherein the training the student model comprises:
determining, by the output layer, a first loss between the first output data and the third output data;
determining, by the classifier layer, a second loss between the second output data and the fourth output data; and
propagating the first loss and the second loss to the hidden layer, according to a backward propagation.

2. The model training method of claim 1, wherein the selecting comprises selecting the first teacher model and the second teacher model, from the plurality of teacher models, based on accuracies of the plurality of teacher models.

3. The model training method of claim 1, further comprising outputting the output data from the plurality of teacher models,
wherein the selecting comprises selecting the first teacher model and the second teacher model, from the plurality of teacher models, based on a correlation between the output data of each of the plurality of teacher models, the output data corresponding to the first input data.

4. The model training method of claim 3, wherein the selecting comprises selecting another teacher model from the plurality of teacher models, in response to determining that the correlation between the output data of the selected first teacher model and the output data of the selected second teacher model is less than a threshold.

5. The model training method of claim 1, wherein the training further comprises training the student model, based on the third output data of the student model.

6. The model training method of claim 1, wherein the selecting and the training are performed iteratively until the student model satisfies a predetermined condition.

7. The model training method of claim 1, wherein the training comprises training the student model, based on the first loss between the third output data of the student model and the first output data of the selected first teacher model, the first output data corresponding to the first input data, and the second loss between the fourth output data of the classifier layer derived from the hidden layer of the student model and the second output data of the selected second teacher model, and
the model training method further comprises determining the first loss and the second loss, using different methods.

8. The model training method of claim 7, wherein the determining the first loss and the second loss comprises determining the first loss and the second loss, based on the first output data output from the selected first teacher model and fifth output data output from a different selected teacher model.

9. The model training method of claim 7, wherein the determining the first loss and the second loss comprises determining the first loss and the second loss by applying different weights to the first output data and the second output data.

10. The model training method of claim 7, further comprising setting an initial weight for the classifier layer to be an initial weight for one among the plurality of teacher models having a size most similar to a size of data that is input into the classifier layer, and selecting the one among the plurality of teacher models having the size most similar to the size of data input into the classifier layer, as the selected first teacher model.

11. The model training method of claim 1, wherein the training comprises training the student model, based on the first output data of the selected first teacher model and correct answer data corresponding to the first input data.

12. The model training method of claim 1, wherein the plurality of teacher models have different initial weights, different neural network structures, different hyper parameters, or different ensembles.

13. The model training method of claim 1, further comprising determining a structure of the first student model, based on a size of data that is input into the selected one first teacher model.

14. A data recognizing method comprising:
receiving target data to be recognized; and
recognizing the target data, using a model that is trained, wherein the model is trained by:
selecting a first neural network and a second neural network implementing a first teacher model and a second teacher model, from a plurality of teacher models, based on an output data of each of the plurality of teacher models;
receiving a first input data at a third neural network implementing a student model; and
training the student model, based on the first input data, and a first output data and a second output data that are respectively output from the first teacher model and the second teacher model with respect to the first input data,
wherein the student model comprises:
an input layer configured to receive the first input data;
an output layer configured to output a third output data;
a hidden layer disposed between the input layer and the output layer; and
a classifier layer derived from the hidden layer and configured to output a fourth output data, and
wherein the training the student model comprises:
determining, by the output layer, a first loss between the first output data and the third output data;
determining, by the classifier layer, a second loss between the second output data and the fourth output data; and
propagating the first loss and the second loss to the hidden layer, according to a backward propagation.

15. The data recognizing method of claim 14, wherein the selecting comprises selecting the first teacher model and the second teacher model, from the plurality of teacher models, based on accuracies of the plurality of teacher models or a correlation between the output data of each of the plurality of teacher models, the output data corresponding to the first input data.

16. The data recognizing method of claim 14, wherein the training comprises:
training the student model, based on the first loss between the third output data of the model and the first output data of the selected first teacher model, the first output data corresponding to the first input data, and the second loss between the fourth output data of the classifier layer derived from the hidden layer of the model and the second output data of the selected second teacher model; and
determining the first loss and the second loss, using different methods.

17. A non-transitory computer-readable recording medium which, when executed, causes a computer to execute a model training method comprising:
selecting a first neural network and a second neural network implementing a first teacher model and a second teacher model, from a plurality of teacher models, based on an output data of each of the plurality of teacher models;

receiving a first input data at a third neural network implementing a student model; and training the student model, based on the first input data, and a first output data and a second output data that are respectively output from the first teacher model and the second teacher model with respect to the first input data, wherein the student model comprises:
an input layer configured to receive the first input data;
an output layer configured to output a third output data;
a hidden layer disposed between the input layer and the output layer; and
a classifier layer derived from the hidden layer and configured to output a fourth output data, and wherein the training the student model comprises:
determining, by the output layer, a first loss between the first output data and the third output data;
determining, by the classifier layer, a second loss between the second output data and the fourth output data; and
propagating the first loss and the second loss to the hidden layer, according to a backward propagation.

18. A model training apparatus comprising:
a processor configured to:
select a first neural network and a second neural network implementing a first teacher model and a second teacher model, from a plurality of teacher models, based on an output data of each of the plurality of teacher models;
receive a first input data at a third neural network implementing a student model; and
train the student model, based on the first input data, and a first output data and a second output data that are respectively output from the first teacher model and the second teacher model with respect to the first input data,
wherein the student model comprises:
an input layer configured to receive the first input data;
an output layer configured to output a third output data;
a hidden layer disposed between the input layer and the output layer; and
a classifier layer derived from the hidden layer and configured to output a fourth output data, and
wherein the processor is further configured to:
determine, by the output layer, a first loss between the first output data and the third output data;
determine, by the classifier layer, a second loss between the second output data and the fourth output data; and
propagate the first loss and the second loss to the hidden layer, according to a backward propagation; and
a memory configured to store the student model that is trained.

19. The model training apparatus of claim 18, wherein the processor is further configured to select the first teacher model and the second teacher model, from the plurality of teacher models, based on accuracies of the plurality of teacher models or a correlation between the output data of each of the plurality of teacher models, the output data corresponding to the first input data.

20. The model training apparatus of claim 18, wherein the processor is further configured to:
train the student model, based on the first loss between the third output data of the student model and the first output data of the selected first teacher model, the first output data corresponding to the first input data, and the second loss between the fourth output data of the classifier layer derived from the hidden layer of the student model and the second output data of the selected second teacher model; and
determine the first loss and the second loss, using different methods.

21. A model trainer comprising:
a processor configured to:
select a first neural network and a second neural network implementing a first teacher model and a second teacher model, from a plurality of teacher models, based on an output data of each of the plurality of teacher models;
receive a first input data at a third neural network implementing a student model; and
train the student model, based on the first input data, and a first output data and a second output data that are respectively output from the first teacher model and the second teacher model with respect to the first input data,
wherein the student model comprises:
an input layer configured to receive the first input data;
an output layer configured to output a third output data;
a hidden layer disposed between the input layer and the output layer; and
a classifier layer derived from the hidden layer and configured to output a fourth output data, and
wherein the processor is further configured to:
determine, by the output layer, a first loss between the first output data and the third output data;
determine, by the classifier layer, a second loss between the second output data and the fourth output data; and
propagate the first loss and the second loss to the hidden layer, according to a backward propagation; and
a memory configured to store the student model that is trained,
wherein the processor is further configured to select the first teacher model and the second teacher model, based on accuracies of the first teacher model and the second teacher model in relation to a predetermined threshold.

22. The model trainer of claim 21, wherein the processor is further configured to select the first teacher model and the second teacher model having accuracies higher than the predetermined threshold in a descending order of accuracy.

* * * * *